Oct. 14, 1969   A. O. PAYNE   3,472,377
SIEVE FOR COMBINE

Filed Jan. 22, 1968   3 Sheets-Sheet 1

INVENTOR.
AMOS O. PAYNE.
BY
SETTLE, BATCHELDER & OLTMAN
ATT'YS.

Oct. 14, 1969      A. O. PAYNE      3,472,377
SIEVE FOR COMBINE

Filed Jan. 22, 1968      3 Sheets-Sheet 2

INVENTOR.
AMOS O. PAYNE.
BY
SETTLE, BATCHELDER & OLTMAN.
ATT'YS.

Oct. 14, 1969   A. O. PAYNE   3,472,377
SIEVE FOR COMBINE
Filed Jan. 22, 1968   3 Sheets-Sheet 3
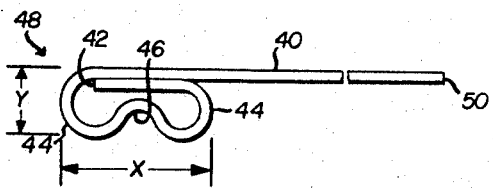
FIG. 6
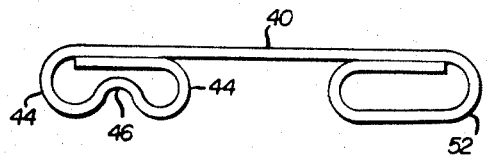
FIG. 6a
FIG. 9
FIG. 8
FIG. 7
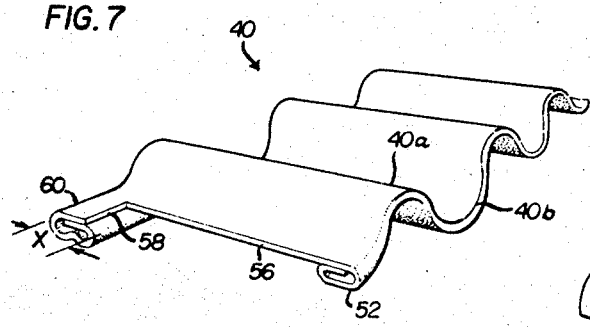
FIG. 10
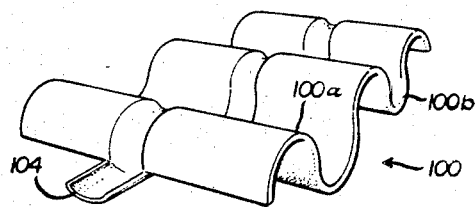
INVENTOR.
AMOS O. PAYNE.
BY
SETTLE, BATCHELDER & OLTMAN.
ATT'YS.

United States Patent Office 3,472,377
Patented Oct. 14, 1969

3,472,377
SIEVE FOR COMBINE
Amos O. Payne, Eldridge, Iowa, assignor to J. I. Case Company, Racine, Wis., a corporation of Wisconsin
Filed Jan. 22, 1968, Ser. No. 699,601
Int. Cl. B07b 1/04
U.S. Cl. 209—394                17 Claims

ABSTRACT OF THE DISCLOSURE

A grain sieve for a combine which is readily removable from its supporting structure. The sieve includes a slotted pivoting mechanism incorporated in the framework of the sieve which is attached to a remote control when the sieve is located on the supporting structure. Each slat or louver is formed in a unique manner from an integral sheet and the final slat construction defines an integral extension for supporting each slat on the framework. Each slat is attached to the framework without the use of screws or other ancillary equipment.

BACKGROUND OF THE INVENTION

The present invention relates generally to grain separators for harvesting machines and more particularly to an improved sieve construction for combines.

In present day commercial harvesting machines, such as combines, the harvested material is generally passed between a threshing cylinder and a concave wherein the grain is separated from its supporting stalks. The grain and supporting stalks, commonly referred to as straw, are then passed over straw racks which remove the major portion of the straw and allow the grains as well as chaff and the lighter straw to pass through openings therein. Subsequently, the grain as well as the chaff and the lighter straw are moved to a cleaning shoe having a plurality of screens or sieves supported thereon. The cleaning shoe is vibrated and at the same time forced air currents are forced upwardly through the sieves to suspend the lighter straw and chaff on a cushion of air and allow the heavier grain to fall through where it is collected and passed to a grain bin while the chaff and straw are passed through the rear opening of the combine.

Conventionally, the screens or sieves consist of a frame which carries a series of rotatably adjustable louvers or slats generally corrugated along the longitudinal dimension. In supporting the slots for pivotal movement on the framework, it has been conventional to preform the sheet defining the slat to its desired configuration and subsequently secure a rod thereto which in turn is pivotally supported on the framework. All the rods of a sieve assembly are generally interconnected in some fashion so as to allow for adjustment relative to the frame thereby varying the size of the openings defined between adjacent slats.

One manner of providing a connection between the rods and a position control is to provide a loop on the rod intermediate its ends for engaging a shifting bar running fore and aft of the sieve so that each louver connected to its respective rod is shifted when the shift bar is moved either forwardly or rearwardly. Another method of shifting the louvers is to provide an offset portion on one end of each of the rods and interconnect the respective offset portions to a shifter bar which is in some manner moved to provide the opening adjustment.

The primary objection to this type of arrangement is the difficulty and time involved in forming all of the elements of the assembly and interconnecting the elements. Furthermore, the number of parts as well as the labor required add to the expense of each screen or sieve assembly.

A further basic objection to the sieve construction heretofore known is that chaff and foreign matter are collected in the pockets formed between the rods and the corrugations of the slat so as to restrict the forced air movement through the sieves thereby preventing proper cleaning of the harvested grain. Also, the collection of chaff and other foreign materials between the rods and the shifter bar make adjustment rather difficult and many times impossible. This necessitates a shutdown of operations to clean the sieve assemblies.

A further objection to the prior art devices is that a considerable amount of time and effort is required to remove the respective sieves from the supporting structure defined by the cleaning shoe. Most prior art structures require that the adjusting mechanism be completely disassembled before the sieve can be removed from the cleaning shoe.

SUMMARY OF THE INVENTION

The present invention provides a simple and effective grain separator which eliminates all of the objections of the prior art devices set forth above.

The primary object of the present invention is to provide an improved slat construction in which an integral sheet material defines the slat construction as well as the conventional support rod.

Another object is to provide an improved method of forming a louver of the above type from an elongated flat sheet.

A further object of the invention is to provide an improved screen or sieve assembly in which the various parts can be assembled in a minimum period of time.

A still further object of the present invention is to provide an improved sieve assembly having an adjusting mechanism incorporated therein and in which the entire assembly can readily be removed from its supporting structure.

Other objects of this invention will appear in the following description and appended claims reference being had to the accompanying drawings forming a part of this specification wherein like reference characters designate corresponding parts in the several views.

On the drawings:

FIGURE 6 is an end view of a flat sheet after it has been partially formed to define the final slat structure;

FIGURE 6a is a view similar to FIGURE 6 showing a slightly modified partially formed sheet;

FIGURE 7 is a fragmentary perspective view of the finished slat construction formed from the partially finished sheet of FIGURE 6;

FIGURE 8 is an elevational view of a slightly modified slat construction similar to that shown in FIGURE 7;

FIGURE 9 is a cross-sectional view of a modified slat after its first step of formation; and FIGURE 10 is a fragmentary perspective view of the finished slat produced from the sheet shown in FIGURE 9.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
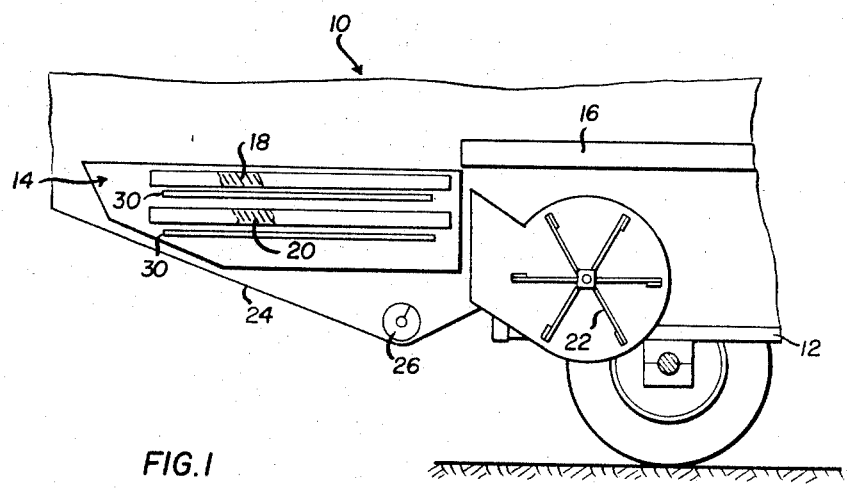
FIGURE 1 shows a fragmentary side elevation view, partly in section, of a conventional harvesting machine having the sieve assemblies of the present invention incorporated therein.

FIGURE 1 of the drawings shows a fragmentary view of a conventional harvesting machine, such as a combine 10. In this type of machine, the harvested material is passed between a cylinder assembly and concave (not shown) and a straw separator which separates the major portion of the straw from the remaining harvested material. The material remaining is the grain to be harvested as well as chaffed and any light straw which pass directly to a cleaning shoe assembly 14 supported on the framework 12 or are moved to the cleaning shoe by a transfer mechanism 16. The cleaning shoe generally supports a chaffer sieve 18 having a main chaffer sieve and a chaffer extension (not shown in detail) while a cleaning sieve 20 is supported directly below the chaffer sieve and finally cleans the grain.

In general operation, a forced draft of air is produced by a variable speed fan 22 which produces a continuous flow of air through the respective sieves to blow the lighter chaff and straw upwardly and subsequently out the rear end of the machine. The heavier grain passes through the respective sieves and is collected in the housing 24 and conveyed by auger 26 to a grain bin (not shown).

The respective sieves 18 and 20 are fixedly secured by any suitable means (not shown) to angle shaped support members 30 carried by the side frame portions of the cleaning shoe assembly 14.

Of course, in an effort to separate all of the grain from the remaining chaff and straw without forcing any grain from the rear end of the machine, it is necessary that each of the sieves 18 and 20 be adjustable so as to vary the size of the opening not only for varying crop conditions but also for harvesting different types of crops. Conventionally, some type of adjustment means has been provided for simultaneously adjusting the various slats or louvers with respect to the sieve framework.

Figure 2:
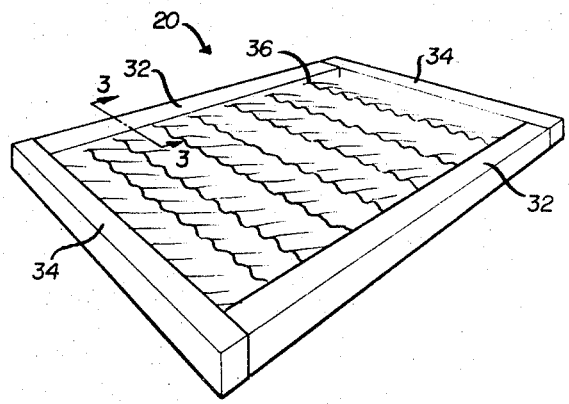
FIGURE 2 is a perspective view of a sieve or screen assembly of the present invention.

Conventionally, the cleaning sieve 20 (as well as sieve 18) shown in FIGURE 2 includes a framework having side frame portions 32 and end frame portions 34 integrally interconnected to define a fixed structure. Pivotally supported intermediate the respective spaced side portions 32 are a plurality of slats or louvers 36. The respective louvers overlap adjacent louvers or sieve sections and are adjustable with respect to the side frames 32 to thereby vary the size of the opening between adjacent slats. Of course, the size of the opening will not only determine the amount and size of material passing through each sieve but will also determine the amount of forced air passing upwardly through the entire assembly.

As was indicated above, the slats or louvers of the prior art sieve constructions generally included a preformed sheet of material fixedly secured, as by welding to some type of rod structure which in turn was pivotally supported on the side frame portions.

According to a primary aspect of the present invention the slats or louvers as well as the supporting structure therefore are formed from a single flat elongated sheet of material. Thus, a flat elongated sheet of material having a length slightly greater than the distance between the respective side frame portions 32 is deformed along one longitudinal edge. In the embodiment illustrated in FIGURE 6, a flat sheet 40 is reversely bent adjacent one edge 42 to produce a three-ply fold along the entire length of the edge of the sheet. The three-ply fold is preferably formed so as to provide an elongated portion having radiused ends 44 and an intermediate reduced area portion 46 so that the final cross sectional configuration may be referred to as oval or hour-glass shaped reinforcing means 48.

The opposite longitudinal edge 50 may be flat as shown in FIGURE 6 or also reversely bent to provide a three-ply fold reinforcing as shown at 52 in FIGURE 6a. After the reinforcing means 48 is formed adjacent one longitudinal edge of the sheet in the manner described above, the longitudinal flat sheet is bent along transverse lines spaced longitudinally along the sheet to produce a corrugated cross sectional configuration having alternate ridges 40a and channels 40b, for a purpose to be described later. Of course, it is readily apparent the deforming the longitudinal edge of the sheet to define the reinforcing means 52 prior to corrugating the sheet will eliminate many pockets which heretofore necessarily resulted from connecting the reinforcing and supporting means to the sheet.

Before or after the sheet has been corrugated to the configuration shown in FIGURE 7, the portions outwardly of the perpendicularly disposed edges 56 and 58 are removed to produce an extension 60 adjacent each end thereof which defines the pivot point or axis for the sheet, as will become apparent hereinafter.

Figure 5:
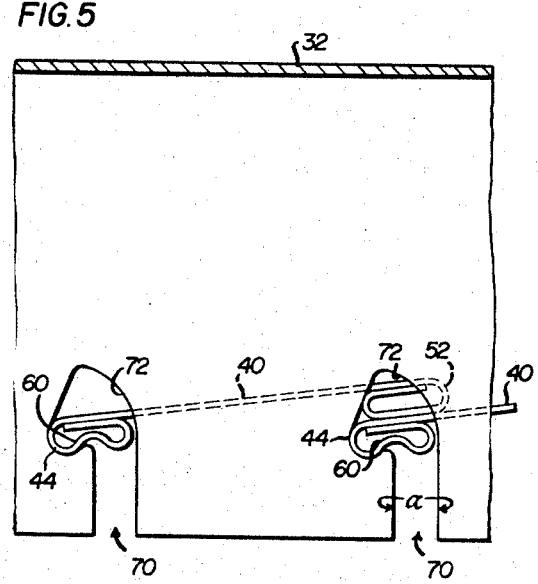
FIGURE 5 is a vertical section taken generally along lines 5—5 of FIGURE 3.

The finally corrugated sheet or louver 40 is subsequently assembled to the side portions 32 of the frame in a manner now to be described. As can be seen from an inspection of FIGURES 6 and 7, each extension 60 has an elongated dimension X which is greater than the transverse dimension Y. The differences in these two dimensions as well as the reduced area portion 46, are utilized in securing the respective slats or louvers to the side frames without any screws or ancillary equipment. Thus, the side portions 32 (which are channel shaped, for a purpose to be described later) have a plurality of vertically extending slots or recesses 70 defined in one of the legs of the channel 32. The upper end of each slot has an enlarged portion 72 which defines the pivot axis for the extension 60 of a louver 40. As can be seen from an inspection of FIGURE 5, the width $a$ of the recess slots 70 is substantially equal to the transferse dimension Y of the extension 60. Also, the diameter of the opening 72 is substantially equal to the elongated dimension X of the extension 60.

Thus, in assembling the respective louvers on the frame structure, each louver is manipulated so that the minimum dimension Y extends across the width of the slot 70 and the enlongated dimension X lies along the axis of the slot 70. In this position, the extensions can be slid through the slots into the enlarged opening 72 and the reduced area portion 46 will allow manipulation of the louvers into the openings. Once received in the opening, the slats or louvers can be pivoted to the position shown in FIGURE 5 and it is readily apparent that each slat cannot move below the axis of the adjacent slat which will thus maintain the respective slats in the recess openings. However, if it is desired to remove any of the slats, it is only necessary to again manipulate the respective slat and slide it through the slot without the use of any tools.

According to the further aspect of the invention, a simple and efficient manner of simultaneously adjusting all of the respective louvers with respect to the frame is provided. Thus, each of the extensions 60 on the respective louvers 40 received in one of the side portions 32 has a lever 62 secured thereto by having the extensions 60 received in opening 61 defined in levers 62 with the openings 61 corresponding to the cross-sectional configuration of the extensions 60. The lever has a substantially circular portion 64 adjacent its upper end thereof which is received in an elongated slot 66 defined on a shifter bar 68 which is slidably supported in the upper end of the channel defining the side portion 32.

Figure 3:
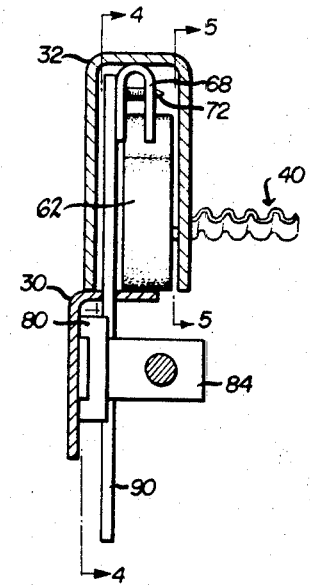
FIGURE 3 is a fragmentary transverse sectional view taken along lines 3—3 of FIGURE 2.

The shifter bar is preferably dimensioned so as to be capable of being disposed horizontally and received between the legs of the side portion 32 of the frame in a position perpendicular to that shown in FIGURE 3. In this manner the shifter bar can be received in the channel 32, and thereafter rotated 90° so that each of the slots or recesses 66 receives one of the levers 62. After the shifter bar 68 is positioned in the position shown in FIGURE 3, the shifter plate 70 may be secured thereto by screws 71. Of course, a suitable opening must be provided along the leg of the channel defining the side portion 32 so that access may be had to insert screws 71.

Figure 4:
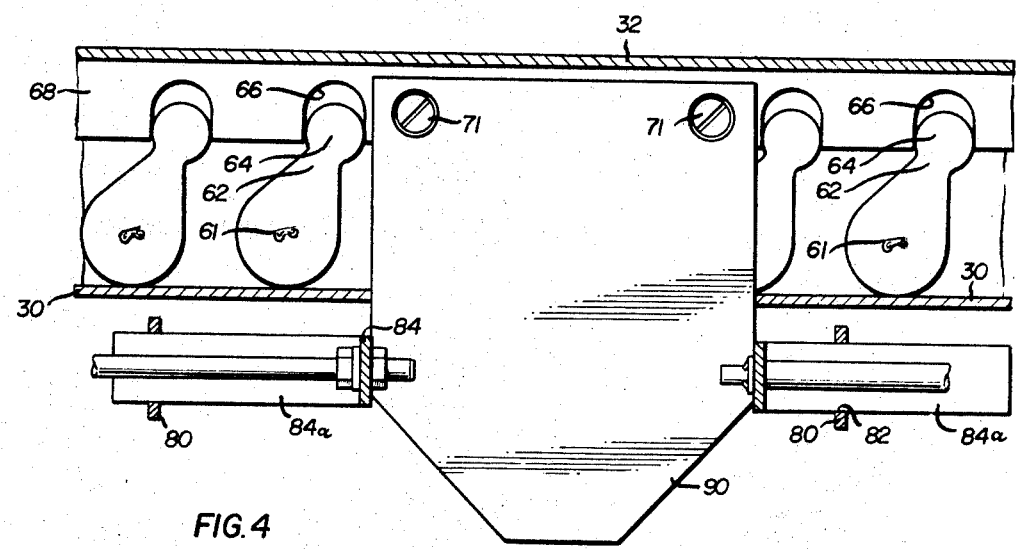
FIGURE 4 is a vertical section taken generally along lines 4—4 of FIGURE 3.

According to a further aspect of the invention, the shifter plate has a connection with a shifter control mechanism which is again capable of being connected or disconnected without utilizing any tools. Thus, in the illustrated embodiment shown in FIGURES 3 and 4, a pair of spaced ears 80 are displaced from the main body of the angle rail 30 and each ear has an opening 82 therein for slidably receiving the legs 84a of a U-shaped clip 84. The U-shaped clip is configured so as to receive the shifter plate 90 with the edges of the plate engaging the U-shaped member shown in FIGURES 3 and 4. It is readily apparent that the interconnection between the plate 90 and clip 84 will transmit any longitudinal movement of the clip directly to the shifter bar 68 to position the respective slats or louvers 40 in response to movement of the clip 84. The sliding interconnection between the lever 62 and the shifter bar 68 again provides an efficient connection without utilizing any screws or other connecting devices.

The clip 84 may be shifted longitudinally by any remote controlled shifting mechanism located adjacent the rear end of the combine, such as a bar or lever connected directly to the clip. However, the shifting mechanism is preferably of the type disclosed and claimed in my copending application for "Remote Adjustment for Combine Sieve" Ser. No. 699,431 filed of even date herewith and assigned to the assignee of the present application.

As can readily be appreciated from the above description, a sieve assembly constructed in accordance with the present invention provides a simple and inexpensive construction which eliminates many of the collection pockets which were heretofore common in this type of assembly. Furthermore, the shifter bar and interconnecting means between the respective louvers is completely enclosed within the side portion of the framework of the assembly. While the lower end of the channel member has been shown to be open, it is readily apparent that a suitable cover plate may be provided to further enclose the entire mechanism.

Another advantageous features of the sieve assembly of the present invention is that the entire assembly can readily be removed and replaced by merely removing screws (not shown) which are normally utilized in connecting the frame portions 32, 34 to the support rail 30. Once the screws have been removed the entire assembly can be lifted from the cleaning shoe supporting structure for any maintenance or replacement.

A slightly modified embodiment of the slat construction of FIGURE 7 is shown in FIGURE 8. In the modified slat construction, the lever for connecting the slat to the shifter bar is formed integral with the slat. Thus, as shown in FIGURE 8, the free end of the extension 60a is bent to approximately a 90° angle to provide an integral lever connection 60b performing the function of the lever 62. The upper end of the extension 60b can be radiused so as to be readily receivable within the recesses or slots 66 defined in the shifter bar 68.

A further modified slat or louvered construction is shown in FIGURES 9 and 10. In this embodiment a flat elongated sheet 100 is deformed along its entire length thereof intermediate the longitudinal edges to define a rib 102. The rib of course defines the reinforcing means equivalent to the reinforcing means 48 described hereinabove with respect to the elongated sheet or plate 40. After the flat or elongated sheet 100 has been deformed to define the reinforcing means 102, the sheet is bent along transverse lines to define a corrugated cross sectional dimension having ridges 100a and channels 100b. Before or after the corrugation step, the end portions of the sheet located on opposite sides of the rib 102 are removed so as to define an extension 104 which again has an elongated dimension greater than the transverse dimension. The respective extensions 104 provide the pivot axis for the respective louvers which of course are again received in the circular openings 72 formed on the legs of the channels defining the side portions 32.

Of course, the interconnection between the shifter bar 68 and the extensions 104 may be in the form of a separate lever 62 or alternatively the extension 104 may be configured in the manner illustrated in FIGURE 8 with respect to the extension 60 so that the lever forms an integral part of the extension.

From the above description, it can be appreciated that the invention provides a simple and efficient manner of producing a sieve assembly with a minimum number of parts and in which all of the parts are positively interconnected in a simple manner and may be disassembled by merely utilizing a screw driver. Furthermore, the entire sieve assembly can very easily be removed from its supporting structure since there is no fixed connection between the shifter plate and the shifter mechanism defined by the clip 84.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims:

I claim:

1. A one-piece louver for a grain separator comprising an elongated generally rectangular sheet deformed to define integral reinforcing means extending the length thereof, said sheet being bent transversely to define a generally sinusoidal configuration longitudinally of said sheet and having portions removed from opposite ends thereof to provide integral extensions on opposite ends of said sheet, said extensions defining pivot and support points for said louver.

2. A louver as defined in claim 1, in which said reinforcing means includes a rib extending longitudinally of said sheet and displaced from the main body of said sheet, said rib extending beyond opposite ends of said sheet to define said integral extensions.

3. A louver as defined in claim 1, in which said reinforcing means includes a folded portion along one longitudinal edge of said sheet, said folded portion extending beyond the ends of said sheet to define said integral extensions.

4. A louver as defined in claim 3, in which said folded portion defines an hour-glass cross sectional configuration and in which said reinforcing means further includes a reversely bent portion on the opposite longitudinal edge of said sheet.

5. A louver as defined in claim 1, in which at least a portion of said reinforcing means extends beyond the opposite ends of said sheet to define said integral extension.

6. A louver as defined in claim 5, in which one of said portions extending beyond the opposite ends is bent along a line transversely of the longitudinal axis of said sheet to define sections whereby the section of said portions intermediate said bend line and said sheet ends define a pivot axis and the remaining section of said portion defines a lever for pivoting said louver.

7. A grain sieve having a framework including side portions pivotally supporting sieve sections, each of said sieve sections comprising a one-piece elongated strip of sheet material having integral reinforcing means defined by deforming said sheet material and extending longitudinally of said sheet, said sheet and reinforcing means being bent to define a corrugated surface along the longitudinal axis of said sheet, said sheet material having portions removed from opposite ends and on opposite sides of said reinforcing means to define extensions on opposite ends of said sheet providing supports engaging said side portions for pivotally mounting each sieve section on said framework.

8. A grain sieve as defined in claim 7, including the further improvement of shifting means enclosed within one of said side portions for simultaneously pivoting said sieve sections on said side portions and means defining a sliding connection between said shifting means and each of said extensions on said one of said side portions.

9. A grain sieve as defined in claim 8, in which said shifting means includes a continuous bar having a plurality of spaced elongated recesses and said sliding connection comprises a lever on each of said sieve sections, said lever having a portion thereof slidably received in one of said recesses.

10. A grain sieve as defined in claim 7, in which said extensions have an elongated dimension extending transversely of the longitudinal axis of said sheet and said side portions each have a plurality of recesses of less width than the length of said elongated portion and an enlarged substantially circular portion on the inner end of each of said recesses, said substantially circular portion having a diameter substantially equal to the length of said elongated portion to define a pivot for said sheet.

11. A grain sieve as defined in claim 7, in which said reinforcing means includes a folded portion along one longitudinal edge of said sheet and extending beyond the ends of said sheet to define said extensions.

12. A grain sieve as defined in claim 7, in which said reinforcing means includes an integral rib intermediate the longitudinal edges of said sheet, said rib extending beyond the ends of said sheet to define said extensions.

13. A cleaning sieve for separating grain comprising a frame including parallel spaced channel members defining frame side portions and each having a horizontal portion and transversely spaced downwardly depending legs extending from said horizontal portion, a plurality of slats pivotally mounted on said side portions and having extensions on opposite ends thereof and pivotally mounted on adjacent legs of said side portions and terminating between the spaced legs of the respective side members, a shifter bar disposed in one of said channels between said legs and below said horizontal portion for simultaneously pivoting said slats on said side portions, and shiftable interconnecting means between said bar and each of said slat extensions disposed in said one of said channels, said shiftable interconnecting means comprising means defining a plurality of recesses on said shifter bar and a separable lever carried by respective ones of said slat extensions, said levers extending substantially perpendicular to the associated extensions and each lever being slidably received in separate ones of said recesses whereby movement of said shifter bar will cause relative movement of said levers in said recesses to adjust said slats relative to said side portions.

14. A method of forming a sieve section for a grain separator and the like from a flat elongated sheet having spaced elongated edges and ends, comprising deforming said sheet along the entire length thereof to produce a reinforcing member for said sheet, bending said sheet and reinforcing member transversely thereof to define a corrugated grain chute surface having alternate ridges and channels, and removing all but the reinforcing members from the opposite ends of said sheet to produce support extensions for said sheet.

15. A method as defined in claim 4, in which said sheet is deformed by reversely bending one edge of said sheet to produce an elongated bulbous portion adjacent said one edge.

16. A method as defined in claim 14, in which said sheet is deformed by bending a portion of the sheet intermediate the edges out of a plane defined by the main body of the sheet to produce a rib on said sheet.

17. A cleaning sieve for separating grain including a frame having spaced longitudinally extending side members and a plurality of slats disposed between said side members each having extensions pivotally mounted on said side members, the improvement of said extensions having a major dimension and a minor dimension extending transversely of said major dimension and being less than said major dimension, means defining slots extending from one edge of each of said side members and terminating at inner ends, and means defining substantially circular openings on the inner ends of said slots, said openings having a diameter substantially equal to said major dimension whereby said slats may be mounted on said side members solely by manipulation of said slats.

References Cited

UNITED STATES PATENTS

| | | | |
|---|---|---|---|
| 2,011,365 | 8/1935 | Kuballe | 209—394 |
| 2,058,381 | 10/1936 | Lindgren | 209—394 |
| 2,253,296 | 8/1941 | Holtzman | 209—394 |
| 2,413,382 | 12/1946 | Sargent et al. | 209—394 |
| 2,554,416 | 5/1951 | Morrissey | 209—394 |
| 2,670,845 | 3/1954 | Busack et al. | 209—312 X |
| 3,334,744 | 8/1967 | James et al. | 209—394 |

TIM R. MILES, Primary Examiner